US00RE46719E

(19) United States
(12) Reissued Patent
Goeders

(10) Patent Number: US RE46,719 E
(45) Date of Reissued Patent: Feb. 20, 2018

(54) MULTIPLE PIECE PITCHING MOUND

(71) Applicant: True Pitch, Inc., Altoona, IA (US)

(72) Inventor: John J. Goeders, Altoona, IA (US)

(73) Assignee: True Pitch, Inc., Altoona, IA (US)

(21) Appl. No.: 14/018,506

(22) Filed: Sep. 5, 2013

Related U.S. Patent Documents

Reissue of:
(64) Patent No.: 8,157,678
Issued: Apr. 17, 2012
Appl. No.: 13/026,517
Filed: Feb. 14, 2011

U.S. Applications:
(63) Continuation of application No. 11/851,566, filed on Sep. 7, 2007, now Pat. No. 8,047,934, which is a continuation-in-part of application No. 11/164,300, filed on Nov. 17, 2005, now Pat. No. 7,361,105.

(51) Int. Cl.
*A63B 71/00* (2006.01)
*A63B 71/02* (2006.01)
*A63B 69/00* (2006.01)

(52) U.S. Cl.
CPC ..... *A63B 71/02* (2013.01); *A63B 69/0002* (2013.01); *A63B 2069/0006* (2013.01); *A63B 2209/02* (2013.01); *A63B 2210/50* (2013.01)

(58) Field of Classification Search
CPC ..... A63B 69/0002; A63B 69/0013; A63B 2069/0006; A63B 71/02; A63B 2209/02; A63B 2210/50
USPC ..... 473/497, 499, 452; D21/780; 273/DIG. 7
See application file for complete search history.

(56) References Cited

U.S. PATENT DOCUMENTS

| | | | | |
|---|---|---|---|---|
| 1,978,121 | A | 10/1934 | Larkey | |
| 3,479,028 | A | 11/1969 | Goeders | |
| 3,837,646 | A * | 9/1974 | Goeders | 473/497 |
| 4,306,718 | A * | 12/1981 | Goeders | 473/497 |
| 4,925,186 | A * | 5/1990 | Stevenson et al. | 473/497 |
| 4,927,140 | A | 5/1990 | Pappas | |
| 4,978,121 | A | 12/1990 | Larkey | |
| D315,382 | S | 3/1991 | Ragsdale | |
| 5,058,889 | A | 10/1991 | Burton | |
| 5,213,323 | A * | 5/1993 | Novinsky | 473/497 |
| 5,467,977 | A * | 11/1995 | Beck | 473/497 |
| 5,624,112 | A * | 4/1997 | Hummel et al. | 473/497 |
| 5,632,689 | A | 5/1997 | Duca | |
| 5,803,820 | A | 9/1998 | McCarty | |
| 5,882,265 | A | 3/1999 | Benton | |
| 7,288,034 | B2 | 10/2007 | Woodard et al. | |
| 7,361,105 | B2 | 4/2008 | Goeders | |
| 2004/0242352 | A1 * | 12/2004 | Panus | 473/497 |
| 2005/0215358 | A1 | 9/2005 | Woodard et al. | |
| 2005/0241593 | A1 | 11/2005 | Kaura | |
| 2007/0111828 | A1 | 5/2007 | Goeders | |
| 2007/0117660 | A1 | 5/2007 | Roberts | |

(Continued)

*Primary Examiner* — Mitra Aryanpour
(74) *Attorney, Agent, or Firm* — Zarley Law Firm, P.L.C.

(57) ABSTRACT

A portable pitching mound having a plurality of shell pieces. Each shell piece has a forward and rearward end with opposite side portions and an upper surface and opposite underside. The shell pieces when placed side by side interlock to one another to form an arcuate shell member. At least one of the plurality of shell pieces have retractable wheels secured therein such that the shell piece is moveable to facilitate transportation.

17 Claims, 3 Drawing Sheets

(56) References Cited

U.S. PATENT DOCUMENTS

| | | | | |
|---|---|---|---|---|
| 2007/0265118 | A1* | 11/2007 | Slatten | 473/497 |
| 2007/0298915 | A1* | 12/2007 | Goeders | 473/497 |
| 2009/0233740 | A1* | 9/2009 | Gensler | 473/497 |

* cited by examiner

MULTIPLE PIECE PITCHING MOUND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a continuation of U.S. Ser. No. 11/851,566 filed Sep. 7, 2007 now U.S. Pat. No. 8,047,934, which is a continuation-in-part which claims the benefit of application Ser. No. 11/164,300 filed Nov. 17, 2005, now U.S. Pat. No. 7,361,105.

BACKGROUND OF THE INVENTION

This invention relates to portable pitching mounds. More specifically this invention relates to a multiple piece portable pitching mound that is able to be easily transported and used in practice applications and actual game applications.

Portable pitching mounds have served well to provide pitching mounds where conventional mounds could not be used (i.e., gymnasiums) or were not available. However, the footing or traction on the surface of the mounds is not the best, particularly as the pitcher completes the pitching motion. Further, the means of securing these mounds to a supporting surface are not always adaptable for both indoor, outdoor and actual game use. Additionally, many portable pitching mounds use vertical walls as support that can add extra weight to the mound as well as making it difficult to use both indoors and outdoors and impossible to use in actual games.

Portable pitching mounds that do not use vertical walls and have a single peripheral edge have been provided to overcome the problems associated with pitching mounds having vertical wall portions. However, many problems remain with these portable pitching mounds. For example, a regulation pitcher's mound has a flat surface which is ten inches high, five feet wide, and 34 inches from front to back located in the approximate center of an 18 foot diameter circle with gradually sloping sides and thus are very large. Because of the unusual shape and size of a pitching mound, transporting pitching mounds to stores to sell provides difficulties. Additionally, when indoor use in a gymnasium of a mound is desired. transporting a mound inside the door of a gymnasium is also problematic. Manufacturing such a large mound is also expensive and difficult.

Thus an object of the present invention is to provide a portable pitching mound that improves upon the state of the art.

Another object of the present invention is to provide a portable pitching mound that is easy to transport.

Yet another object of the present invention is to provide a portable pitching mound that is easy to assemble.

These and other objects, features, or advantages of the present invention will become apparent from the specification and claims.

BRIEF SUMMARY OF THE INVENTION

A portable pitching mound that has a plurality of shell pieces with forward and rearward ends, opposite side portions, an upper surface and opposite under side. When the pieces are placed in side by side relation the plurality of pieces form an arcuate shell member. Each shell piece has an interlocking means that secure the plurality of pieces together when the pieces are placed in side by side relation. At least one of the plurality of shell pieces has a retractable wheel secured therein such that the shell piece is mobile.

DETAILED DESCRIPTION OF THE PREFERRED EMBODIMENT

Figure 1:
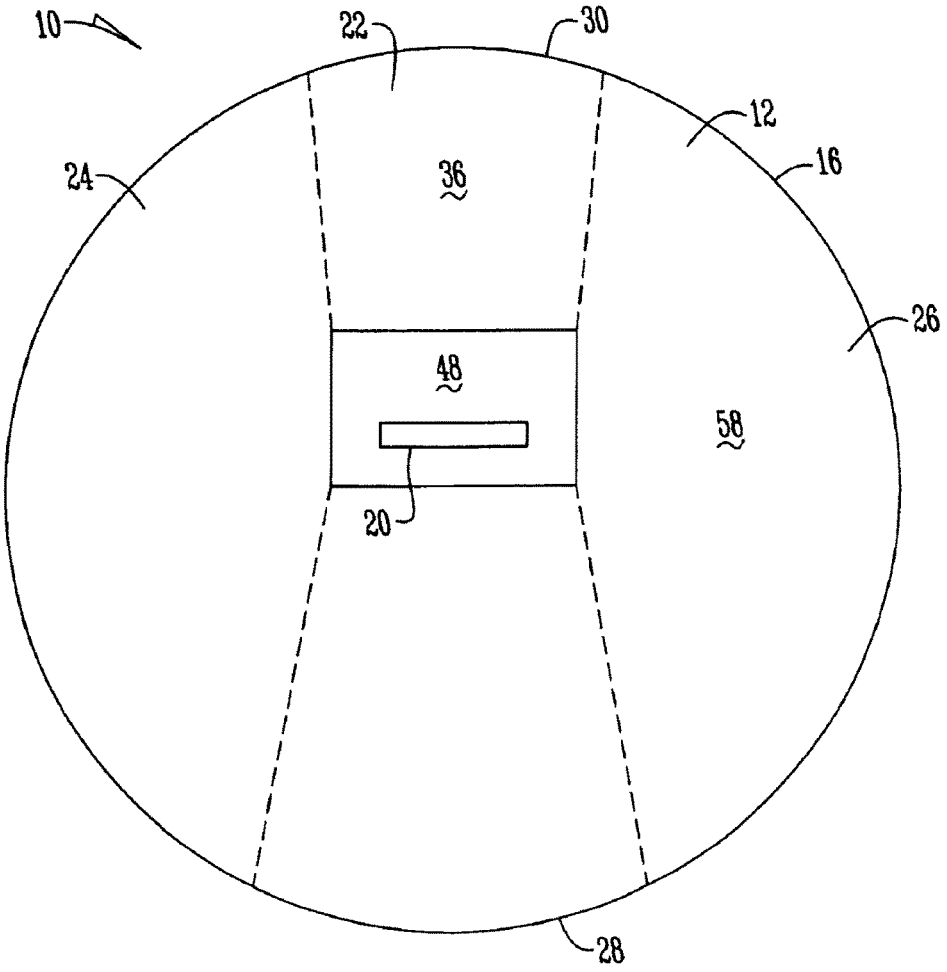
FIG. 1 is a top plan view of a portable pitching mound.
Figure 2:
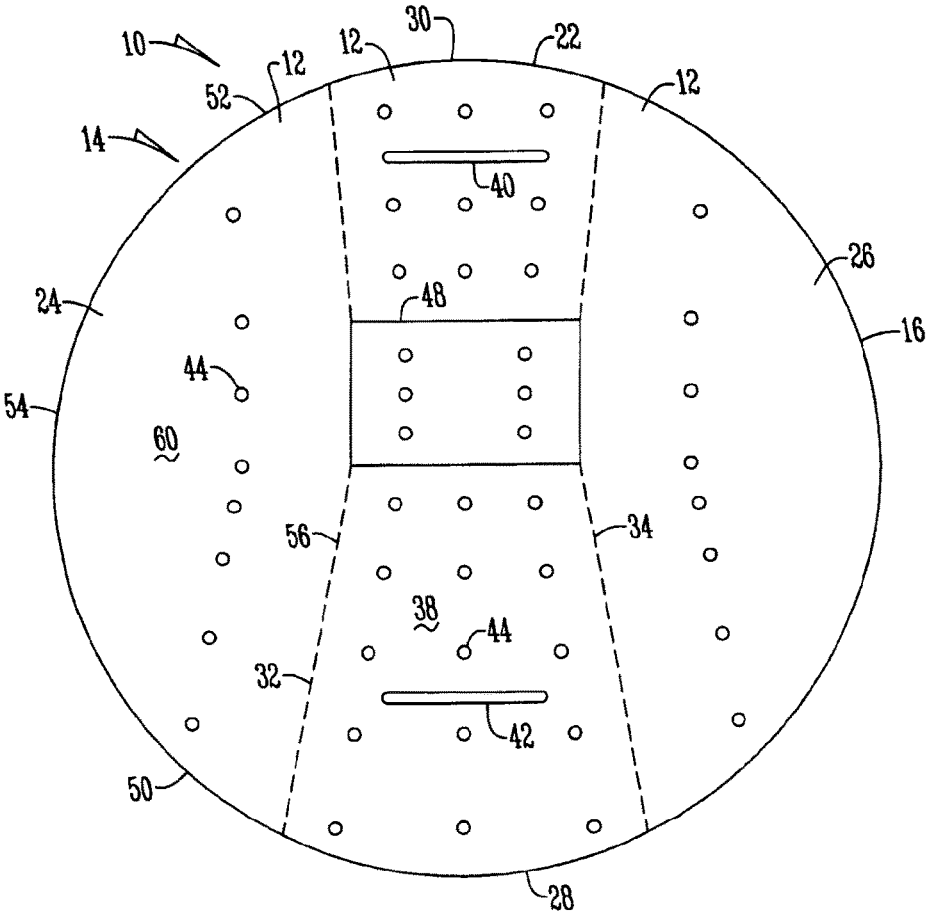
FIG. 2 is a bottom plan view of a portable pitching mound.
Figure 3:
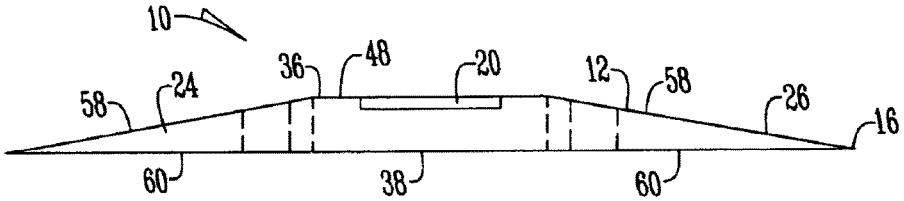
FIG. 3 is a side plan view of a portable pitching mound.

Numeral 10 designates a mound that is formed from a plurality of mound or shell pieces 12 that when placed in a side by side relation form a Fiberglass® shell 14 of oval shape and arcuate in cross section. The mound 10 is supported by a lower peripheral edge 16 to which is glued a strip of frictional material such as Astroturf® or the like. A pitching rubber 20 is secured to a shell piece 12 and is centrally located. In a preferred embodiment the mound piece 12 in front of the pitching rubber 20 has a layer of grass-like material secured thereon and extends under and is detachably secured to the rubber 20. The grass-like material provides a landing area for the pitcher. Other frictional materials may also be used.

In this embodiment the mound 10 is broken into three separate pieces. Specifically, the mound 10 has a center shell piece 22 that is detachably secured to first and second side shell pieces 24 and 26. Specifically, the center piece 22 has forward and rearwards ends 28 and 30, opposite side portions 32 and 34 and an upper surface and opposite under side 36 and 38. Disposed in and through the underside 38 of the center piece 22 are first and second wheels 40 and 42. The first and second wheels 40 and 42 are retractably secured within the center piece such that when actuated the wheels extend from the bottom of the center piece 22 to contact the ground to facilitate transportation of the center piece 22. The center piece 22 additionally has a plurality of supports 44 on its underside 38 that extend to the ground so as to add rigidity to the mound without adding excessive weight. The center piece 22 additionally has a level platform 48 that provides a level surface for placing the rubber 20 thereon. In a preferred embodiment the level platform is rectangular shaped though the platform could be arcuate or other shapes without falling outside the spirit and scope of this disclosure.

The first and second side pieces 24 and 26 similarly have forward and rearward ends 50 and 52, opposite side portions 54 and 56, an upper surface 58 and an opposite underside 60. Specifically, a side portion 56 of the first and second shell pieces 24 and 26 matingly and detachably engage side portions 32 and 34 of the center piece 22 respectively. This attachment could be through overlapping S-shaped members, nails, bolts, zippers, tape, hooks and loops, tongue and groove, or the like. Similar to the center piece 22 the underside 60 of first and second side pieces 24 and 26 have a plurality of supports 44 that extend to the ground so as to add rigidity to the mound without adding excessive weight.

In operation the mound 10 is used by an individual to practice pitching or in actual game use. When finished or the mound needs to be relocated the first and second side pieces 24 and 26 are detached from the center piece 22. The first and second side pieces in a preferred embodiment weighs approximately 175 pounds each and are made of Fiberglass®. Thus, a team of players can pick up the first and second side pieces 24 and 26 and relocate them to a desired location. Meanwhile, the wheels 40 and 42 may be extended in the center piece 22 to allow a lawn tractor or individuals to pull and roll the center piece to the desired location. In a preferred embodiment the center piece weights more than the first and second side pieces and is approximately 650 pounds. Once the pieces are taken to a desired location the pieces can be reassembled together and the mound 10 can be used for its intended purpose.

By having the mound 10 built in three individual interlocking sections the manufacturing process is facilitated. Similarly, shipping, assembly and portability at the point of use are all improved. Additionally, because the mound 10 is made of Fiberglass® the mound should last indefinitely with minimal maintenance. Thus, the only maintenance that needs to be provided for the pieces is replacing the Astroturf® after wear and other routine maintenance. As a result, an improved pitching mound 10 is provided and at the very least all of the objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A portable pitching mound, comprising:

a center shell piece having a first and a second side portion that are opposite of one another;

a first shell piece having a side portion that engages the first side portion of the center shell piece;

a second shell piece having a side portion that engages the second side portion of the center shell piece;

wherein the center, first, and second shell pieces form a shell that is oval in shape with an arcuate cross section when engaged and the center shell piece extends the length of the oval shell between a forward end and a rearward end; and wherein the center shell piece includes a pitching rubber centrally located on the center piece.

2. The portable pitching mound of claim 1 wherein the first shell piece and second shell piece connect to the center shell piece by way of a connection member.

3. The portable pitching mound of claim 2 wherein the connection member extends the length of the first and second side portions of the center shell piece.

4. The portable pitching mound of claim 2 wherein the connection member extends the length of the first side portion of the first shell piece and the length of the second side portion of the second shell piece.

5. The portable pitching mound of claim 1 wherein the center shell piece is symmetric along an axis that extends through the center of the oval shell from the forward end to the rearward end.

6. The portable pitching mound of claim 1 wherein the center shell piece has a plurality of supports which are flush with a bottom edge of the pitching mound.

7. The portable pitching mound of claim 1 wherein the first side portion and the second side portion have a plurality of supports which are flush with a bottom edge of the pitching mound.

8. The portable pitching mound of claim 1 further comprising a lower peripheral edge having a frictional material thereon.

9. The portable pitching mound of claim 1 wherein the center piece has a level platform for placing the pitching rubber thereon.

10. The portable pitching mound of claim 1 wherein the center piece has a landing area in front of the pitching rubber.

11. A portable pitching mound, comprising:

a center shell piece having a forward end and a rearward end, and a first and a second side portion that are opposite of one another that extend a length between the forward end and the rearward end;

a first shell piece having a forward end and a rearward end, and a side portion that engages the length of the first side portion of the center shell piece;

a second shell piece having a forward end and a rearward end, and a side portion that engages the length of the second side portion of the center shell piece;

wherein the center, first, and second shell pieces form a shell that is oval in shape with an arcuate cross section when engaged and the center shell piece extends the length of the oval shell between a forward end and a rearward end; and wherein the center shell piece includes a pitching rubber centrally located on the center piece.

12. The portable pitching mound of claim 11 further comprising wherein the side portion of the first shell piece engages the entire length of the first side portion of the center shell.

13. The portable pitching mound of claim 12 further comprising wherein the side portion of the second shell piece engages the entire length of the second portion of the center shell.

14. The portable pitching mound of claim 11 wherein the forward end and rearward end of the center shell piece have a lower peripheral edge having a frictional material thereon.

15. A portable pitching mound, comprising:

a center shell piece having a first and a second side portion that are opposite of one another;

a first shell piece having a side portion that engages the first side portion of the center shell piece;

a second shell piece having a side portion that engages the second side portion of the center shell piece;

wherein the center, first, and second shell pieces form a shell that is oval in shape with an arcuate cross section when engaged and the center shell piece extends the length of the oval shell between a forward end and a rearward end;

wherein the center shell piece has a plurality of supports that extend to the ground so as to add rigidity; and wherein the center shell piece includes a pitching rubber centrally located on the center piece.

*16. A portable pitching mound, comprising:*

*a center shell piece having a first and a second side portion that are opposite of one another;*

*a first shell piece having a side portion that engages the first side portion of the center shell piece;*

*a second shell piece having a side portion that engages the second side portion of the center shell piece;*

*wherein the center, first and second shell pieces form a shell that is oval in shape with an arcuate cross section when engaged and the center shell piece extends between a forward end and a rearward end that extend between the first and second side portions that are opposite of one another;*

*wherein at least one of the ends of the center piece align with an adjacent end of the first and second side pieces to form an arcuate peripheral edge of the oval; and*

*wherein the center shell piece includes a pitching rubber centrally located on the center piece.*

*17. A portable pitching mound, comprising:*

*a center shell piece having a first and a second side portion that are opposite of one another;*

*a first shell piece having a side portion that engages the first side portion of the center shell piece:*

*a second shell piece having a side portion that engages the second side portion of the center shell piece:*

*wherein the center, first and second shell pieces form a shell that is oval in shape with an arcuate cross section when engaged, and wherein each of the center, first and second shell pieces having a forward end and a rearward end forming an arcuate peripheral edge of the oval shell; and*

*wherein the center shell piece includes a pitching rubber centrally located on the center piece.*

* * * * *